US009224391B2

(12) United States Patent
Colibro et al.

(10) Patent No.: US 9,224,391 B2
(45) Date of Patent: Dec. 29, 2015

(54) METHOD AND SYSTEM FOR AUTOMATICALLY PROVIDING LINGUISTIC FORMULATIONS THAT ARE OUTSIDE A RECOGNITION DOMAIN OF AN AUTOMATIC SPEECH RECOGNITION SYSTEM (75) Inventors: Daniele Colibro, Turin (IT); Claudio Vair, Turin (IT); Luciano Fissore, Turin (IT); Cosmin Popovici, Turin (IT)

(73) Assignee: Nuance Communications, Inc., Burlington, MA (US)

( * ) Notice: Subject to any disclaimer, the term of this patent is extended or adjusted under 35 U.S.C. 154(b) by 1990 days.

(21) Appl. No.: 11/884,473

(22) PCT Filed: Feb. 17, 2005

(86) PCT No.: PCT/EP2005/050712
§ 371 (c)(1),
(2), (4) Date: Aug. 16, 2007

(87) PCT Pub. No.: WO2006/087040
PCT Pub. Date: Aug. 24, 2006

(65) Prior Publication Data
US 2008/0270129 A1    Oct. 30, 2008

(51) Int. Cl.
*G10L 15/19* (2013.01)
*G10L 15/187* (2013.01)
(Continued)

(52) U.S. Cl.
CPC .............. *G10L 15/19* (2013.01); *G10L 15/187* (2013.01); *G10L 15/00* (2013.01); *G10L 15/06* (2013.01)

(58) Field of Classification Search
USPC ........... 704/1–5, 7, 9–10, 231, 270–271, 277, 704/E17.001–E17.016, E15.001–E15.05
See application file for complete search history.

(56) References Cited

U.S. PATENT DOCUMENTS 4,723,290 A * 2/1988 Watanabe ............... G10L 15/10
                                                    704/254
4,882,757 A * 11/1989 Fisher .................... G10L 15/193
                                                    704/241

(Continued)

FOREIGN PATENT DOCUMENTS

CA    WO 2006/037218      *  4/2006
WO    WO 2006/069600 A1      7/2006

OTHER PUBLICATIONS

Reynolds, Douglas A. "Robust Text-Independent Speaker Identification Using Gaussian Mixture Speaker Models," IEEE Transactions on Speech and Audio Processing, Vo.3, No. 1, Jan. 1995.*

(Continued)

*Primary Examiner* — Pierre-Louis Desir
*Assistant Examiner* — David Kovacek
(74) *Attorney, Agent, or Firm* — Hamilton, Brook, Smith & Reynolds, P.C.

(57) ABSTRACT

A method for automatically providing a hypothesis of a linguistic formulation that is uttered by users of a voice service based on an automatic speech recognition system and that is outside a recognition domain of the automatic speech recognition system. The method includes providing a constrained and an unconstrained speech recognition from an input speech signal, identifying a part of the constrained speech recognition outside the recognition domain, identifying a part of the unconstrained speech recognition corresponding to the identified part of the constrained speech recognition, and providing the linguistic formulation hypothesis based on the identified part of the unconstrained speech recognition.

17 Claims, 6 Drawing Sheets (51) Int. Cl.
*G10L 15/00* (2013.01)
*G10L 15/06* (2013.01)

(56) References Cited

U.S. PATENT DOCUMENTS

| | | | | |
|---|---|---|---|---|
| 4,977,598 | A * | 12/1990 | Doddington | G10L 15/14 704/255 |
| 5,349,645 | A * | 9/1994 | Zhao | G10L 15/142 704/243 |
| 5,384,893 | A * | 1/1995 | Hutchins | 704/267 |
| 5,617,488 | A * | 4/1997 | Hong | G06K 9/726 382/209 |
| 5,710,866 | A * | 1/1998 | Alleva et al. | 704/256.4 |
| 5,797,123 | A * | 8/1998 | Chou et al. | 704/256.5 |
| 5,799,276 | A * | 8/1998 | Komissarchik et al. | 704/251 |
| 5,806,029 | A * | 9/1998 | Buhrke | G10L 15/144 704/244 |
| 5,878,164 | A * | 3/1999 | Brown | G06K 9/00865 382/190 |
| 5,884,259 | A * | 3/1999 | Bahl | G10L 15/08 704/242 |
| 5,940,793 | A * | 8/1999 | Attwater et al. | 704/231 |
| 6,006,181 | A * | 12/1999 | Buhrke | G10L 15/30 704/231 |
| 6,108,410 | A * | 8/2000 | Reding et al. | 379/265.03 |
| 6,185,528 | B1 * | 2/2001 | Fissore et al. | 704/232 |
| 6,188,976 | B1 * | 2/2001 | Ramaswamy et al. | 704/9 |
| 6,282,507 | B1 * | 8/2001 | Horiguchi et al. | 704/3 |
| 6,438,520 | B1 * | 8/2002 | Curt et al. | 704/254 |
| 6,499,011 | B1 * | 12/2002 | Souvignier et al. | 704/240 |
| 6,691,089 | B1 * | 2/2004 | Su et al. | 704/244 |
| 6,757,652 | B1 * | 6/2004 | Lund | G10L 15/32 704/252 |
| 7,043,426 | B2 * | 5/2006 | Roberge et al. | 704/231 |
| 7,092,883 | B1 * | 8/2006 | Gretter | G10L 15/08 704/242 |
| 7,197,457 | B2 * | 3/2007 | Weng et al. | 704/255 |
| 7,379,870 | B1 * | 5/2008 | Belvin et al. | 704/255 |
| 7,383,172 | B1 * | 6/2008 | Jamieson | 704/9 |
| 7,574,356 | B2 * | 8/2009 | Parthasarathy | 704/231 |
| 7,624,020 | B2 * | 11/2009 | Yamada et al. | 704/277 |
| 7,653,545 | B1 * | 1/2010 | Starkie | 704/275 |
| 7,890,325 | B2 * | 2/2011 | Liu et al. | 704/240 |
| 2002/0133341 | A1 * | 9/2002 | Gillick | G10L 15/32 704/235 |
| 2002/0161569 | A1 * | 10/2002 | Itoh et al. | 704/2 |
| 2002/0178005 | A1 * | 11/2002 | Dusan et al. | 704/254 |
| 2002/0198713 | A1 * | 12/2002 | Franz et al. | 704/252 |
| 2003/0009335 | A1 * | 1/2003 | Schalkwyk et al. | 704/257 |
| 2003/0182131 | A1 * | 9/2003 | Arnold et al. | 704/275 |
| 2004/0049388 | A1 * | 3/2004 | Roth | G10L 15/22 704/251 |
| 2004/0220809 | A1 * | 11/2004 | Wang et al. | 704/257 |
| 2004/0220813 | A1 * | 11/2004 | Weng et al. | 704/277 |
| 2006/0009974 | A1 * | 1/2006 | Junqua et al. | 704/257 |
| 2006/0015336 | A1 * | 1/2006 | Parthasarathy | 704/235 |
| 2007/0016401 | A1 * | 1/2007 | Ehsani et al. | 704/9 |
| 2007/0112567 | A1 * | 5/2007 | Lau et al. | 704/240 |
| 2007/0127688 | A1 * | 6/2007 | Doulton | 379/265.01 |
| 2007/0136059 | A1 * | 6/2007 | Gadbois | G10L 15/32 704/246 |
| 2007/0192084 | A1 * | 8/2007 | Appleby | 704/9 |
| 2007/0226164 | A1 * | 9/2007 | Geib et al. | 706/52 |
| 2008/0019496 | A1 * | 1/2008 | Taschereau | 379/218.01 |
| 2008/0114595 | A1 * | 5/2008 | Vair et al. | 704/236 |
| 2008/0133245 | A1 * | 6/2008 | Proulx et al. | 704/277 |
| 2008/0270129 | A1 * | 10/2008 | Colibro et al. | 704/236 |
| 2008/0319748 | A1 * | 12/2008 | Nakano et al. | 704/251 |
| 2009/0138260 | A1 * | 5/2009 | Terao | G10L 25/78 704/219 |

OTHER PUBLICATIONS

Brain, et al. "How Cell Phones Work." Howstuffworks.com. Archived Jan. 8, 2004. Accessed Mar. 27, 2014. <https://web.archive.org/web/20040108134432/http://electronics.howstuffworks.com/cell-phone.htm/printable>.*

Huang et al.; "Hidden Markov Models", Spoken Language Processing: A Guide to Theory, Algorithm, and System Development, Prentice Hall, Chapter 8, pp. 377-413, (2001).

Gillick et al.; "A probabilistic Approach to Confidence Estimation and Evaluation", Proc. of the IEEE International Conference on Acoustics, Speech and Signal Processing, Munich, Germany, pp. 879-882, (1997).

Adorno et al.; "Toward Automatic Adaptation of the Acoustic Models and of Formulation Variants in a Directory Assistance Application", Proceedings of ISCA ITR-Workshop, pp. 175-178, Sophia-Antipolis (France), (2001).

Popovici et al.; "Learning New User Formulation in Automatic Directory Assistance", Proceedings of ICASSP, pp. I-17-I-20, Orlando (USA), (2002).

Adnorno et al.; "Incremental Learning of New User Formulations in Automatic Directory Assistance", Eurospeech 2003—Geveva, pp. 1925-1928, (2003).

Raymond et al.; "Automatic Learning of Interpretation Strategies for Spoken Dialogue Systems", Acoustics, Speech, and Signal Processing, Proceeding, (ICASSP '04). IEEE International Conference on Montreal, Quebec, Canada, vol. 1, pp. 425-428, (2004).

* cited by examiner

METHOD AND SYSTEM FOR AUTOMATICALLY PROVIDING LINGUISTIC FORMULATIONS THAT ARE OUTSIDE A RECOGNITION DOMAIN OF AN AUTOMATIC SPEECH RECOGNITION SYSTEM

CROSS REFERENCE TO RELATED APPLICATION

This application is a national phase application based on PCT/EP2005/050712, filed Feb. 17, 2005, the content of which is incorporated herein by reference.

TECHNICAL FIELD OF THE INVENTION

The present invention relates in general to an automatic voice service based on automatic speech recognition, and in particular to a method and a system for automatically providing hypothesis of linguistic formulations that are uttered by users of an automatic voice service based on an automatic speech recognition system and that are outside a recognition domain of the automatic speech recognition system.

BACKGROUND ART

As is known, voice-driven applications and complex voice services are based on automatic speech recognition systems (ASRs), which are designed to convert a digital representation of a voice signal, which conveys the speech, into a textual sequence of words, which hypothesizes the lexical content of the voice signal. The automatic recognition process uses stochastic acoustic models, hence, the result produced, in terms of sequence of recognized words, may be affected by an other than zero residual error rate. Furthermore, the domain of the formulations recognized by an automatic speech recognition system is in any case tied to a limited vocabulary, formalized by means of a statistical model of the language or context-free grammars, which can be traced back to finite-state automata (this is the case, for example, of a grammar that describes the way of pronouncing a date or a time).

The most advanced automatic speech recognition systems also enable recognition within flexible vocabularies, which are defined by the user and described by means of appropriate formalisms. To achieve this result, the voice models used for recognition are made up of elementary acoustic-phonetic units (APUs), the sequential composition of which enables representation of any word of a given language.

The mathematical tools used for describing the temporal evolution of the voice are the so-called Hidden Markov Models (HMMs), and each elementary acoustic-phonetic unit is represented by a Hidden Markov Model, which is formed by states that describe the temporal evolution thereof. The words to be recognized, which are described as sequences of elementary acoustic-phonetic units, are obtained by concatenating individual constituent Hidden Markov Models.

In addition to describing the temporal evolution of the speech, hidden Markov models enable generation of the likelihoods of emission of the acoustic states that form them, given the observation vectors that convey the information of the voice signal. The sequence of the probabilities, together with their temporal evolution, enables the recognition result to be obtained. For a more detailed description of theory, algorithms and implementation of Hidden Markov Models, reference may be made to Huang X., Acero A., and Hon H. W., *Spoken Language Processing: A Guide to Theory, Algorithm, and System Development*, Prentice Hall Chapter 8, pages 377-413, 2001.

The pronunciation of words outside the vocabulary or of formulations that are not covered consequently generates recognition errors. Therefore, automatic speech recognition systems also provide a measure of the reliability of the recognized words, in particular a reliability indicator comprised between 0 and 1, which is known in the literature as confidence measure and can be applied to the individual recognized words and/or to their sequence. In the event of recognition error, the confidence measure should assume low values, and in any case lower than those that are assumed in the absence of errors. A threshold on the confidence values measured can be fixed so as to prevent proposal of results that are not so reliable.

A technique that is widely used to compute the confidence measure consists in normalizing either the so-called a posteriori likelihoods, which are quantities derived from the emission likelihoods, or directly the emission likelihoods, that concur in the confidence measure computation. The comparison of the two quantities, i.e., the result obtained applying the constraints and the result obtained relaxing the constraints, provides information useful for determining the confidence. In fact, if the two quantities have comparable values, it means that the introduction of the recognition constraints has not produced any particular distortion with respect to what would have happened without recognition constraints. The recognition result may therefore be considered reliable, and its confidence should have high values, close to its upper limit. When, instead, the constrained result is considerably worse than the unconstrained result, it may be inferred that the recognition is not reliable in so far as the automatic speech recognition system would have produced a result different from the one obtained as a consequence of the application of the constraints. In this case, the confidence measure ought to produce low values, close to its lower limit.

An example of this technique is proposed in Gillick M. et al., *A Probabilistic Approach to Confidence Estimation and Evaluation*, Proc. of the IEEE International Conference on Acoustics, Speech and Signal Processing, Munich, Germany, pp. 879-882 (May 1997), where the difference between quantities known as acoustic score and best score is adopted, where the two terms are obtained respectively by averaging the acoustic score (with constraints) and the best score (without constraints), produced for each frame by the acoustic hidden Markov models on the time interval corresponding to the words.

In PCT/EP/0453718 filed on Dec. 28, 2004 in the name of the Applicant, it is instead proposed a confidence measure based upon differential contributions computed for each frame of an analysis window as a difference between an unconstrained acoustic score and a constrained acoustic score, and averaged over the entire recognition interval. This makes it possible to act on the individual differential contribution of the summation, by applying thereto a respective normalization function, which makes the confidence measure homogeneous in terms of rejection capability and invariant with respect to language, vocabulary and grammar, and, in general, to the recognition constraints. This facilitates to a great extent development of applications in the initial stages of their development, since they do not require any specific calibration for each individual recognition session. The normalization function applied to the individual differential terms is constituted by a family of cumulative distributions, one for each differential contribution to the confidence measure. Each function can be estimated in a simple way based upon a set of training data and is specific for each state of the elementary acoustic-phonetic unit. Hence, the proposed solution does not require heuristic considerations or a priori assumptions and makes it possible to obtain all the quantities necessary for deriving the differential confidence measure directly from the training data.

One of the main problems experienced by the designers of voice-driven applications or voice services based on automatic speech recognition is the correct prediction of the behaviour of the users, which problem is typically faced by creating grammars targeted at acquiring information from users without however using too extensive vocabularies or creating excessively complex graphs. The risk, in fact, is that an improvement in the coverage of formulations from marginal users is paid in terms of higher recognition errors made by the system on canonical formulations due to the increase in complexity. On the other hand, for directory assistance or call routing services, it is extremely difficult to predict the manner in which the users will formulate their requests.

A possible solution to this problem, that does not make use of an automatic data analysis, consists in making a first version of the grammars using test data, fielding the service, that will consequently have sub-optimal performance, and, at the same time, collecting data relative to its use in the field, which typically consists of the audio files with the users' requests. Human operators then label the dialogue turns involved in system failures, and once a substantial amount of data has been labeled, statistics can be generated on the causes of failure: recognition errors, possible errors due to systems-level reasons and cases in which the user requests are not catered for by the system, can be numbered amongst these. For the last type of error, when frequent, it is possible to extend the grammars utilized, so as to increase coverage, or use other, more sophisticated strategies. The application designers, for example, could change the voice prompts related to one or more dialog turns, in order to help the users formulate their requests. This solution is however extremely expensive because the data must be analyzed by human operators to know exactly the content of the user request.

Also known in the art are automatic analysis systems based on the use of data collected in the field, relative to interactions with real users, for improving the performance of the grammars and language models utilized in a voice service. In particular, data is automatically acquired by the recognition systems and is not checked by operators for reasons of excessively high costs, with the risk of it containing recognition errors. For example, in U.S. Pat. No. 6,499,011 the recognition results, i.e., the first N-Best hypotheses, with N>1, are used to make adjustments to the language models in order to improve applications in which the amount of material used to train the initial language models is quite poor. In this case, the performance improvement is focused on improving the modelling of already predicted formulations.

A technology that has been tested for an automatic directory assistance service is described in U.S. Pat. No. 6,185,528 and is based on discrete words, although an item in the recognition vocabulary could also be a sequence of words and not necessarily a single word. With regard to the business subscriber directories, great variability in the way users of the service express their requests has been observed. As the contents of the database for these users is not sufficient to extract information on the linguistic formulation utilized by the callers, it is necessary to perform a complex task to derive the possible pronunciation variants for each database record.

Within this context, an automatic learning system has been developed that utilizes the data collected in the field to determine the linguistic formulations utilized most frequently by the users and not contemplated by the system implementing the automatic directory assistance service. The information regarding calls for which the automatic directory assistance system is not able to satisfy the user's requests has been considered. These calls are handed over to a human operator, who talks with the user to provide the requested number. The available data for each call is represented by saved audio files, which contain the dialogues between the user and the automatic directory assistance system, the unconstrained phonetic transcription of each audio file (unconstrained phonetic transcription represents the most likely sequence of phonemes and although imprecise, more often than not it represents what the user has pronounced fairly well) and information regarding the telephone number supplied by the human operator. From these pieces of information, those regarding the most frequently requested telephone numbers have been selected.

The Applicant has noted that, given an extremely large set of requests for the same number, there is a high probability of obtaining phonetic strings that are similar to each other. The concept of distance between two strings of phonemes can be introduced by performing a Viterbi alignment, for a detailed description of which reference may be made to the above-referenced *Spoken Language Processing: A Guide to Theory, Algorithm, and System Development*, chapter 8, and using the probabilities of deletion, insertion or substitution of phonemes, which probabilities are trained with data controlled through the alignment of the unconstrained phonetic transcriptions with the corresponding correct phonetic transcriptions. The set of phonetic transcriptions, for each frequently requested telephone number, is subsequently clustered into similar subsets using a hierarchical neighbor-search algorithm, based on distance between the phonetic strings. A set of similar phonetic transcriptions is determined by configuring a threshold for the maximum distance of the phonetic strings forming part of the same cluster. Subsets with few elements or having a large difference in distance between the constituent phonetic strings are discarded. For clusters characterized by high cardinality and low dispersion on the constituent phonetic strings, the central element (representative element), defined as the phonetic string with the lowest sum of distances in relation to the other elements of the set, is selected.

It is worthwhile observing that when the number of elements in a cluster is sufficiently high, the representative element provides a good phonetic transcription of the requested entry. The entire architecture of the automatic learning system, the results of the trials carried out and the improvements in terms of automation (increase in percentage of calls satisfactorily handled by the automatic directory assistance system) are described in detail in:

Adorno M., P. Laface, C. Popovici, L. Fissore, C. Vair, *Towards Automatic Adaptation of the Acoustic Models and of Formulation Variants in a Directory Assistance Application*, Proceedings of ISCA ITR-Workshop, pp. 175-178, Sophia-Antipolis (France), 2001; and Popovici C., P. Laface, M. Adorno, L. Fissore, M. Nigra, C. Vair, *Learning New User Formulation in Automatic Directory Assistance*, Proceedings of ICASSP, 1448-1451, Orlando (USA), 2002.

However, the automatic learning developed in this context requires voice service data, such as user confirmations and telephone numbers provided by the operator for handover calls, to identify the individual phonetic strings that will subsequently be utilized. In addition, the representative phonetic strings that are found are added as items to a discrete word vocabulary.

In this connection, the Applicant has noted that the commonly used continuous speech recognition systems which are based on grammars or language models, work on the entire phrase that is pronounced and do not identify only the portion of the users' formulations that is outside the recognition domain. The local identification of words that are not contemplated by the recognition grammars or language models within a repetition would be particularly advantageous because firstly it would allow benefiting from the results of the phonetic learning algorithms, even with a not excessively abundant amount of data, and secondly it would allow not covered words to be detected even if other covered words within the sequence change (as long as these are permitted by grammatical constraints), whilst a system that works on discrete words is not capable of working as efficiently in such cases.

OBJECT AND SUMMARY OF THE INVENTION

The object of the present invention is to provide a contribution to resolution of the problems related to insufficient coverage of formulations frequently used by users of an automatic voice service, and in particular, to identify, with a good safety margin, those portions of the input speech that have no relation to the grammar or the language model employed, on the basis of recognition data.

This object is achieved in the present invention by a method for automatically providing a hypothesis of a linguistic formulation that is uttered by a user of an automatic voice service based on an automatic speech recognition system and that is outside a recognition domain of said automatic speech recognition system, characterized by:

providing a constrained speech recognition and an unconstrained speech recognition from an input speech signal;

identifying a part of said constrained speech recognition outside said recognition domain;

identifying a part of said unconstrained speech recognition corresponding to said identified part of said constrained speech recognition; and providing said linguistic formulation hypothesis based on said identified part of said constrained speech recognition.

In preferred embodiments of the method of the present invention, identifying a part of said constrained speech recognition outside said recognition domain includes:

computing confidence measures (Conf(t)) for different parts of said constrained speech recognition; and identifying said part of said constrained speech recognition outside said recognition domain based on said confidence measures (Conf(t));

wherein said confidence measures (Conf(t)) may be computed for phonemes of said constrained speech recognition; or wherein identifying said part of said constrained speech recognition outside said recognition domain based on said confidence measures (Conf(t)) may include:

identifying parts of said constrained speech recognition with confidence measures (Conf(t)) that meet a given criterion, wherein identifying parts of said constrained speech recognition with confidence measures (Conf(t)) that meet a given criterion may include:

computing instantaneous confidence scores ($C_{ist}(t)$) as a temporal average of said confidence measures (Conf(t)) within a moving window; and identifying parts of said constrained speech recognition with instantaneous confidence scores ($C_{ist}(t)$) that meet a first relation, wherein each instantaneous confidence score ($C_{ist}(t)$) may be computed according to the following formula:

$$C_{ist}(t) = \frac{1}{2T+1} \sum_{t=-n-T}^{n+T} Conf(t)$$

wherein (Conf(t)) is said confidence measure, and 2T+1 is width of said moving window centered at time t.

In the above method, said first relation may be defined by said instantaneous confidence scores ($C_{ist}(t)$) being lower than a given threshold.

In other preferred embodiments of the method of the present invention, identifying a part of said unconstrained speech recognition corresponding to said identified part of said constrained speech recognition may include:

identifying a part of said input speech signal corresponding to said identified part of said constrained speech recognition; and identifying a part of said unconstrained speech recognition corresponding to said identified part of said input speech signal.

The method of the present invention may further include:

deleting any silences at the start or at the end of the said identified part of said unconstrained speech recognition; or may further include:

saving said identified part of said unconstrained speech recognition in a database of recognitions outside said recognition domain, wherein said identified part of said unconstrained speech recognition may be saved in said database of recognitions outside said recognition domain of its length meets a second relation;

wherein said second relation may be defined by the length of said identified part of said unconstrained speech recognition being within a defined range.

The method of the present invention may further include:

processing said database of recognitions outside said recognition domain to provide said hypothesis of linguist formulation that is outside said recognition domain.

In still other preferred embodiments of the present invention, said recognition domain may include a recognition grammar and/or a language model.

The object of the present invention is also achieved by a system for automatically providing hypothesis of linguistic formulations that are uttered by users of an automatic voice service based on an automatic speech recognition system and that are outside a recognition domain of the automatic speech recognition system, said system being configured to implement the method of the present invention as defined herein.

It is another object of the present invention to provide a computer program product comprising a computer program codeable, when loaded in a processing system, to implement the method of the present invention as defined herein.

It is still another object of the present invention to provide an automatic voice service based on an automatic speech recognition system, comprising:

receiving an input speech signal;

performing an automatic speech recognition based on said input speech signal; and providing a hypothesis of a linguistic formulation that is uttered by a user of said automatic voice service and that is outside a recognition domain of said automatic speech recognition system, characterized in that said hypothesis is automatically provided by implementing the method of the present invention as defined herein.

The computer program product may include a non-transitory computer readable medium.

The present invention achieves the aforementioned object by providing a sequence of constrained phonemes and a sequence of unconstrained phonemes, computing confidence measures for the constrained phonemes, identifying parts of the input speech signal corresponding to constrained phonemes with confidences measures below a threshold, and identifying unconstrained phonemes corresponding to the identified parts of the input speech signal. The identified unconstrained phonemes are saved in a database of recognitions outside the recognition domain, which database is processed to provide hypothesis of frequently used formulations outside said recognition domain. These frequently used formulations may then be used to widen the recognition domain or perform a different phonetic learning.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
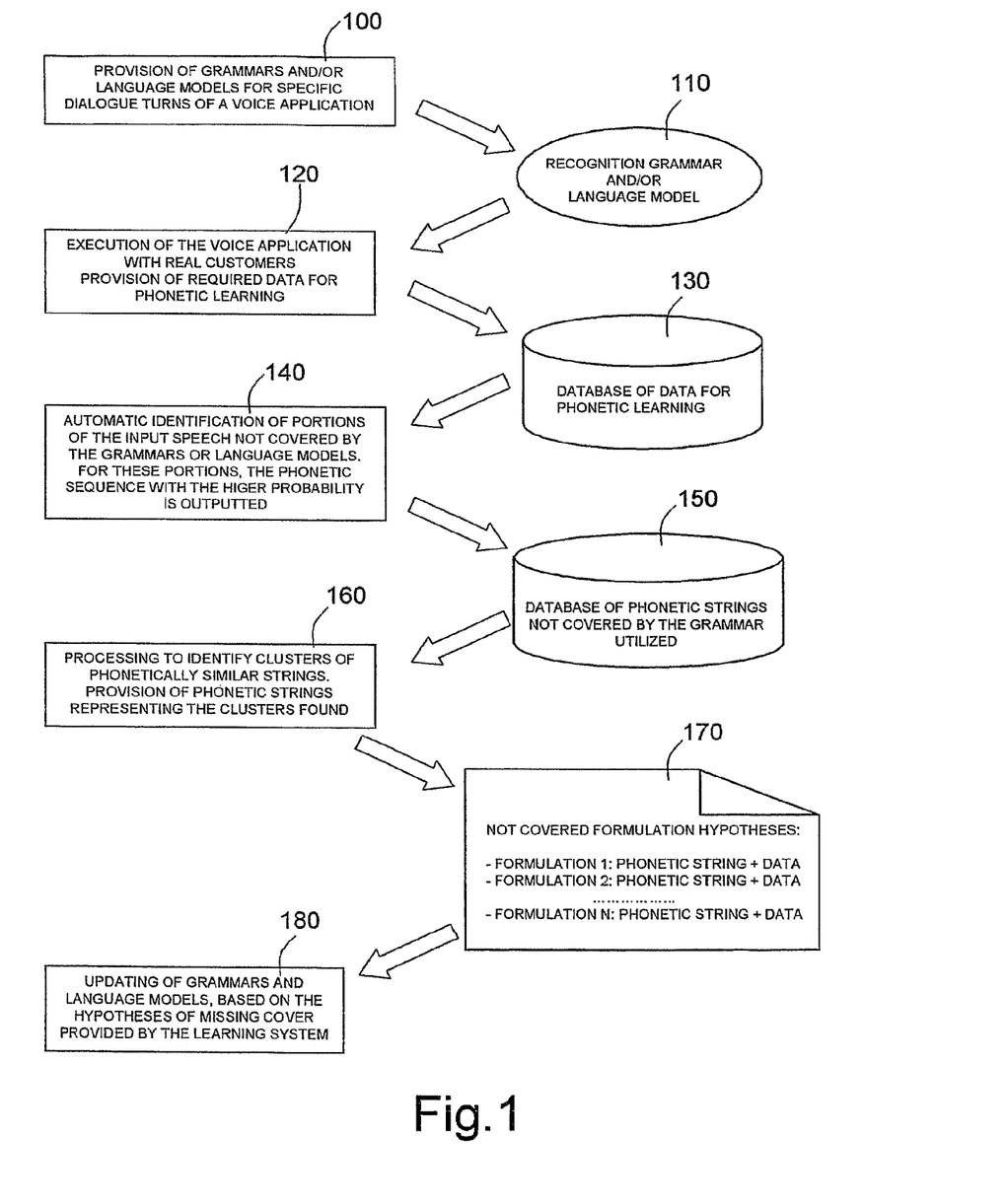
FIG. 1 shows a flowchart of activities related to development of an automatic phonetic-learning-enabled voice service.

FIG. 1 shows a flowchart of activities related to development of an automatic phonetic-learning-enabled voice service, wherein identification of the parts of the users' formulations that are not covered by the recognition grammar or the language model is performed according to the present invention.

As shown in FIG. 1, the first step is creating a first version of the grammars and language models utilized in the service using all the available knowledge, for example knowledge regarding similar services that are already implemented, also with human operators, can be used or adequate trials with a reduced number of users could be arranged (block 100). In any case, the objective is that of creating a first version of the recognition objects utilized in the service through analysis of the presumed behaviour of the users, which object, although representing the best that can be achieved, could have gaps regarding the more frequent linguistic expressions. The recognition objects generated in this way will still however be used in the first version of the service.

Once a first version of the grammars and language models have been created (block 110), the service is fielded, i.e., the voice application with the recognition objects generated in the previous step is executed with real customers (block 120). In this phase, even if the service has inevitably sub-optimal performance, data relative to its use in the field are collected, which typically consists of the audio files with the users' requests. In addition to the data concerning what the user said, the automatic speech recognition system also provides data necessary for phonetic learning, which data is saved in a database (block 130).

The database is then analyzed to identify the parts of the users' formulations that are not covered by the recognition grammar or the language model utilized, as will be described in more detail hereinafter with reference to FIG. 6 (block 140). In the case where some kind of inconsistency was detected, for example, if it was considered that what is recognized in a given time interval is not covered by the grammar used, the phoneme sequence that, for the automatic speech recognition system used, best models what was pronounced by the user within this time interval, is considered. This phonetic string, which for high-performance automatic speech recognition systems should represent what was said by the user in a fairly consistent manner (unlike that which is understood by the grammar) is stored in a database together with other phonetic strings obtained in the same manner on different recognitions turns, and therefore, potentially with other users (block 150).

Once a substantial amount of data has been analyzed, the database of phonetic strings not covered by the recognition grammar is processes to identify clusters of similar phonetic transcriptions and to find representative phonetic strings for the clusters (block 160). If the analysis is successful and the representative phonetic strings are identified, the latter are provided to the application developers as hypotheses of not covered formulations, accompanied by information regarding the data that generated them (block 170).

The designers then carry out a validation activity, with possible updating of the recognition objects to check the hypotheses produced by the system (block 180).

For example, grammars may be extended, so as to increase coverage, or other, more sophisticated strategies may be used. The designer, for example, could change the voice prompts related to one or more dialog turns, in order to help the users formulate their requests.

It is worthwhile noting that all the analysis tasks are automatically performed. The designers will receive data on the probably most frequent failures and should check them on a very limited set of data that are suggested by the phonetic learning system. So the validation task is quite simple and the human work involved is incomparably less than that required to manually label all the system failures.

Figure 2:
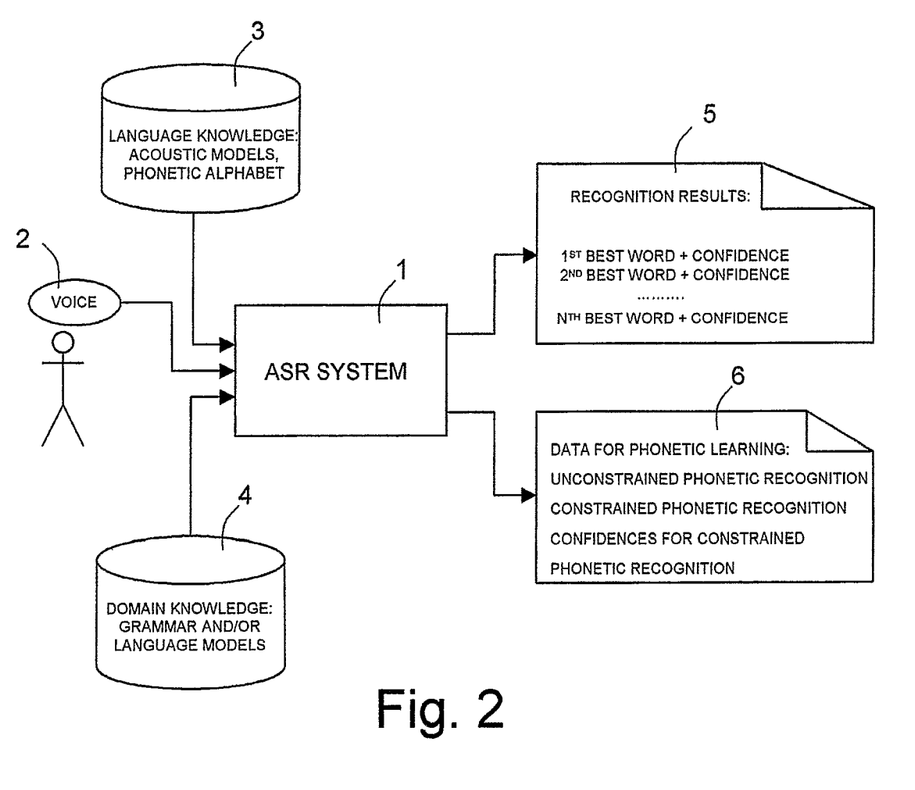
FIG. 2 shows an outline of the knowledge required by an automatic speech recognition system to perform phonetic learning of linguistic formulations not covered by the recognition grammar and/or the language model, and the results it provides.

FIG. 2 shows an outline of the knowledge required by an automatic continuous speech recognition system (block 1) to recognize an input speech (block 2) and to perform phonetic learning of linguistic formulations not covered by recognition grammars and language models, and the results it provides. In general, the elementary sounds employed for forming words and phrases are different according to the language used: it is therefore necessary to define a phonetic alphabet that models the elementary sounds, which are usually defined in terms of phonemes, for each language supported by the automatic speech recognition system. As well as a phonetic alphabet, an automatic speech recognition system needs acoustic models, typically created with multivariate Gaussian probability densities or neural networks, for calculating the emission probabilities, or rather to estimate the probability that the user has uttered a certain phoneme at a certain time. The phonetic alphabet and its correlated acoustic models represent the knowledge of the language and are normally provided by a manufacturer of the ASR technology (block 3). Obviously, in order to understand what the user has said it is necessary for the user's voice to be in the format of a digital audio stream, typically with a sampling frequency of 8 KHz in the field of telephony and 16 KHz in the multimedia one. Lastly, linguistic knowledge regarding the domain of admissible formulations is required (block 4). Typically, this depends on the service's point of dialogue and the information that must be requested from users, such as dates, amounts, times, menu options, etc. The final objective of phonetic learning technology is the improvement of this type of knowledge through the analysis of user behaviour.

The results that an automatic speech recognition system must supply in an automatic phonetic-learning-enabled voice service are the results relative to the individual recognition turns: the recognized words, possibly with their semantic interpretation, the recognition confidence score, which expresses the reliability, and, optionally, the results regarding recognition hypotheses other than the best one (block 5). This data is however not enough to perform phonetic learning, and it necessary that the automatic speech recognition system provides further information. The additional data required is the unconstrained and constrained phonetic recognition, the confidence measure of the individual phonemes, and the time frames in which they are recognized (block 6).

Unconstrained phonetic recognition represents the most probable phoneme sequence for the automatic speech recognition system of what the user pronounced. The main property of this recognition is the fact that it covers all voice input and represents what the users pronounce fairly well, especially if the automatic speech recognition system is of high quality.

Constrained phonetic recognition represents the segmentation of what is pronounced by the users into phonemes, with the restriction that the phoneme sequence is necessarily that relative to the first hypothesis for the recognition turn. While the most significant information content for unconstrained phonetic recognition is held in the sequence of recognized phonemes, with the timing information relative to the time frames (calculated with respect to the start of audio acquisition) in which each individual phoneme was detected, for constrained phonetic recognition the relevant information is not that regarding the sequence, but that contained in the confidence of the individual phonemes and in the time frames in which they are recognized.

The way in which the parts of the users' formulations that are not covered by the recognition grammar or the language model utilized are identified according to the present invention is the result of an in-depth analysis by the Applicant of the difference in the confidence measures for constrained and unconstrained phonetic recognitions in the case when the phrase pronounced by the user is one of those covered by the formulation domain permitted by the recognition grammar employed, and in the case where the phrase pronounced by the user differs significantly from those covered by the formulation domain permitted by the recognition grammar.

Figure 3:
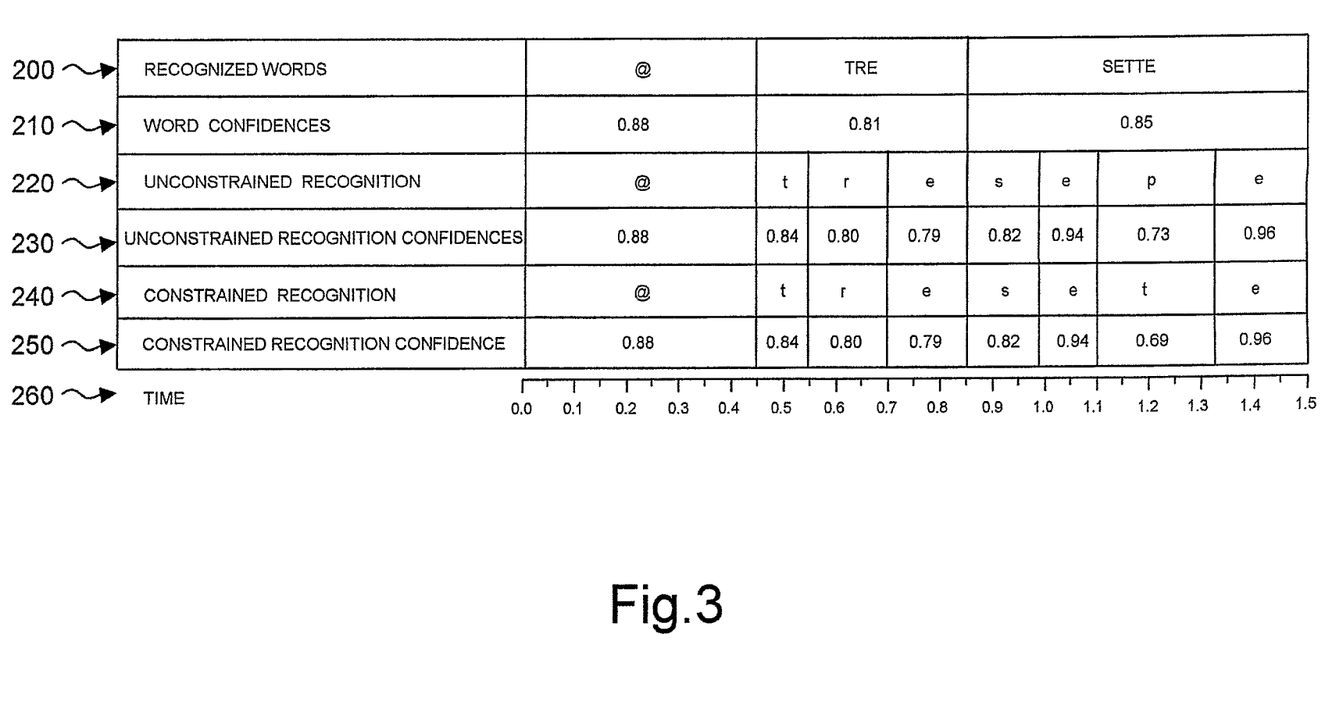
FIG. 3 shows a table containing data relating to an unconstrained phonetic recognition in the case where the phrase pronounced by the user is completely covered by the recognition grammar employed.

In particular, in FIG. 3 it is possible to analyze an unconstrained phonetic recognition in the case of complete grammar coverage, wherein an Italian connected-digit grammar has been used. In particular, FIG. 3 shows a table in which the first row, referenced by 200, shows the recognized words, the second row, referenced by 210, shows the confidence measures of the recognized words, the third row, referenced by 220, shows the phonemes in the unconstrained phonetic recognition, the fourth row, referenced by 230, shows the confidence measures of the phonemes in the unconstrained phonetic recognition, the fifth row, referenced by 240, shows the phonemes in the constrained phonetic recognition, the sixth row, referenced by 250, shows the confidence measures of the phonemes in the constrained phonetic recognition, and the seventh row, referenced by 260, shows the time with reference to the start of audio acquisition.

In the example of FIG. 3, the user has pronounced the phrase "TRE SETTE" (THREE SEVEN), and recognition has been successful with a very high confidence of 0.81 for the word "TRE" and 0.85 for the word "SETTE". The unconstrained phonetic recognition is represented by the string "@-t-r-e-s-e-p-e", where "@" is the symbol representing silence. FIG. 3 also shows the confidence of the individual phonemes, which are always high for voice instances in unconstrained phonetic recognition and the time segments estimated by the automatic speech recognition system with reference to the start of audio acquisition, which segments represent the positioning, in terms of time frames, of the words within the recognised phrase. It can also be easily seen that for the automatic speech recognition system, the word "TRE" starts after approximately 0.45 seconds and ends after 0.85 seconds. The constrained phonetic recognition is obtained by considering the phonemes that form the first recognition hypothesis and performing a recognition pass on them. In the example, it can be observed that the phonetic sequence is "@-t-r-e-s-e-t-e", because the system has correctly recognized the phrase pronounced by the user. Note that the confidences are very high and comparable to those of the unconstrained phonetic recognition; this is an indication of the reliability of the recognition that has been performed. Lastly, it may be observed that in the case under exam, the confidence of the unconstrained phonetic recognition represents an upper limit that can be equaled by constrained phonetic recognition, but never exceeded. This last property can be appreciated by observing how the confidence of the wrong "p" phoneme is greater than that of the right "t" phoneme recognized by constrained recognition.

Figure 4:
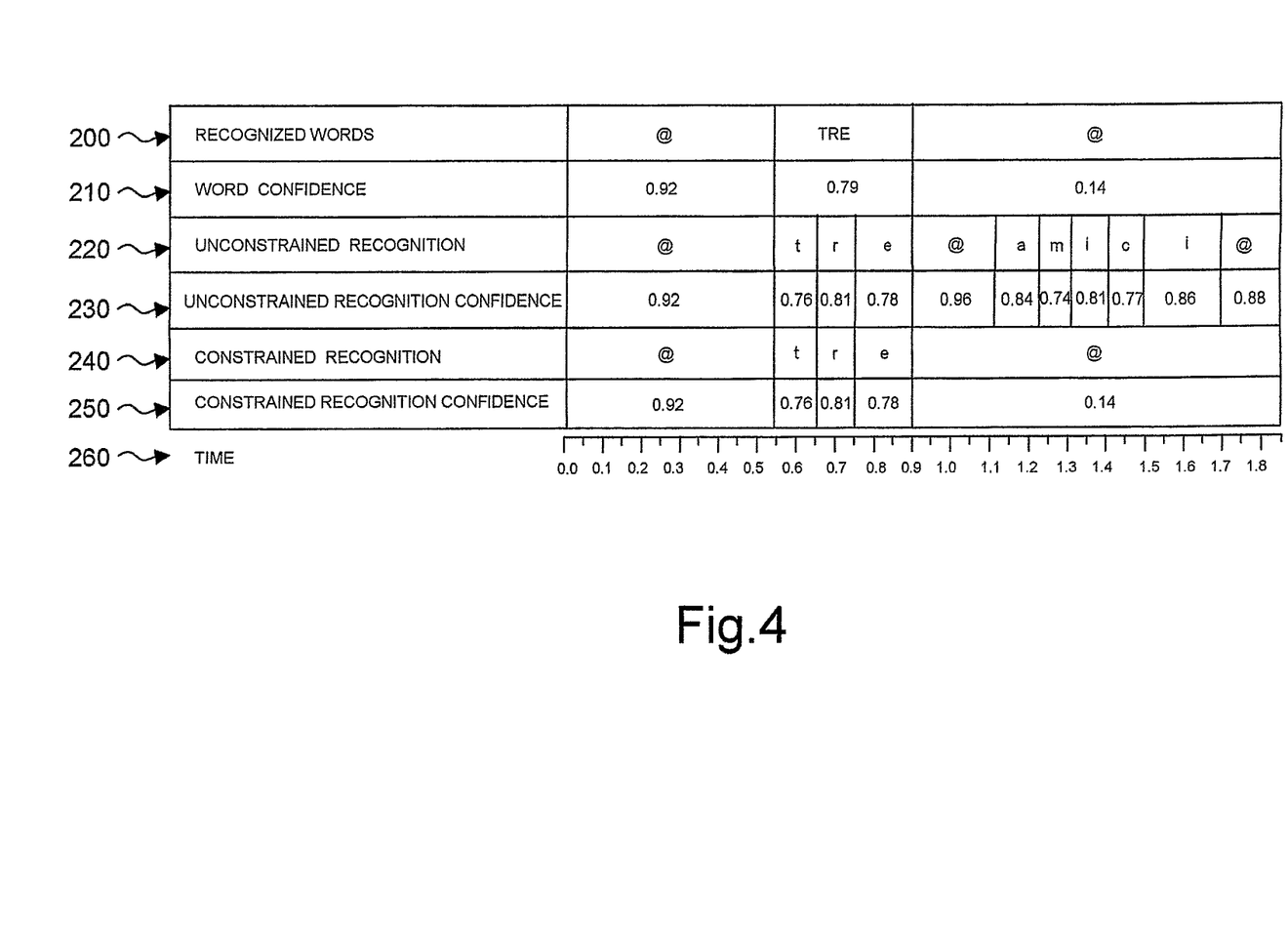
FIG. 4 shows a table containing data relating to an unconstrained phonetic recognition in the case where the phrase pronounced by the user differs significantly from those permitted by the recognition grammar employed.

In FIG. 4 it is possible to analyze an unconstrained phonetic recognition in the case where the phrase pronounced by the user differs significantly from those permitted by the recognition grammar employed, wherein the same grammar and table structure as those used in the example of FIG. 3 are used.

In this case, the user has pronounced the phrase "TRE AMICI" (THREE FRIENDS), which is clearly not covered by the grammar because of the word "AMICI" (FRIENDS). It may be appreciated that the initial "SILENCE" and the word "TRE" have high confidences (0.92 and 0.79, respectively), while the final "SILENCE" that the automatic speech recognition system has selected to cover the word "AMICI" as best it can, has a very low confidence score of 0.14. The recognition results should therefore be considered unreliable and this is definitely consistent. It can also be easily seen that for the automatic speech recognition system, the word "TRE" starts after approximately 0.55 seconds and ends at around 0.9 seconds, whereas the word "AMICI", is between 1.11 and 1.7 seconds. On the other hand, the unconstrained phonetic recognition is practically perfect: the resultant phonetic string in this case is "@-t-r-e-@-a-m-i-c-i-@" and it may be appreciated that all of the phonemes in the sequence have high confidences. By analyzing the example in FIG. 4, it is therefore possible to observe how the constrained phonetic recognition contains information regarding the problem of covering the word "AMICI" with the grammar utilized by the users. This problem is actually highlighted by the low confidence of the final phoneme of the constrained sequence "@", which lasts almost 1 second. In may also be appreciated that in this case the information regarding the extra-domain formulation was even detectable at word level, as the final word "SILENCE" has a very low confidence.

Figure 5:
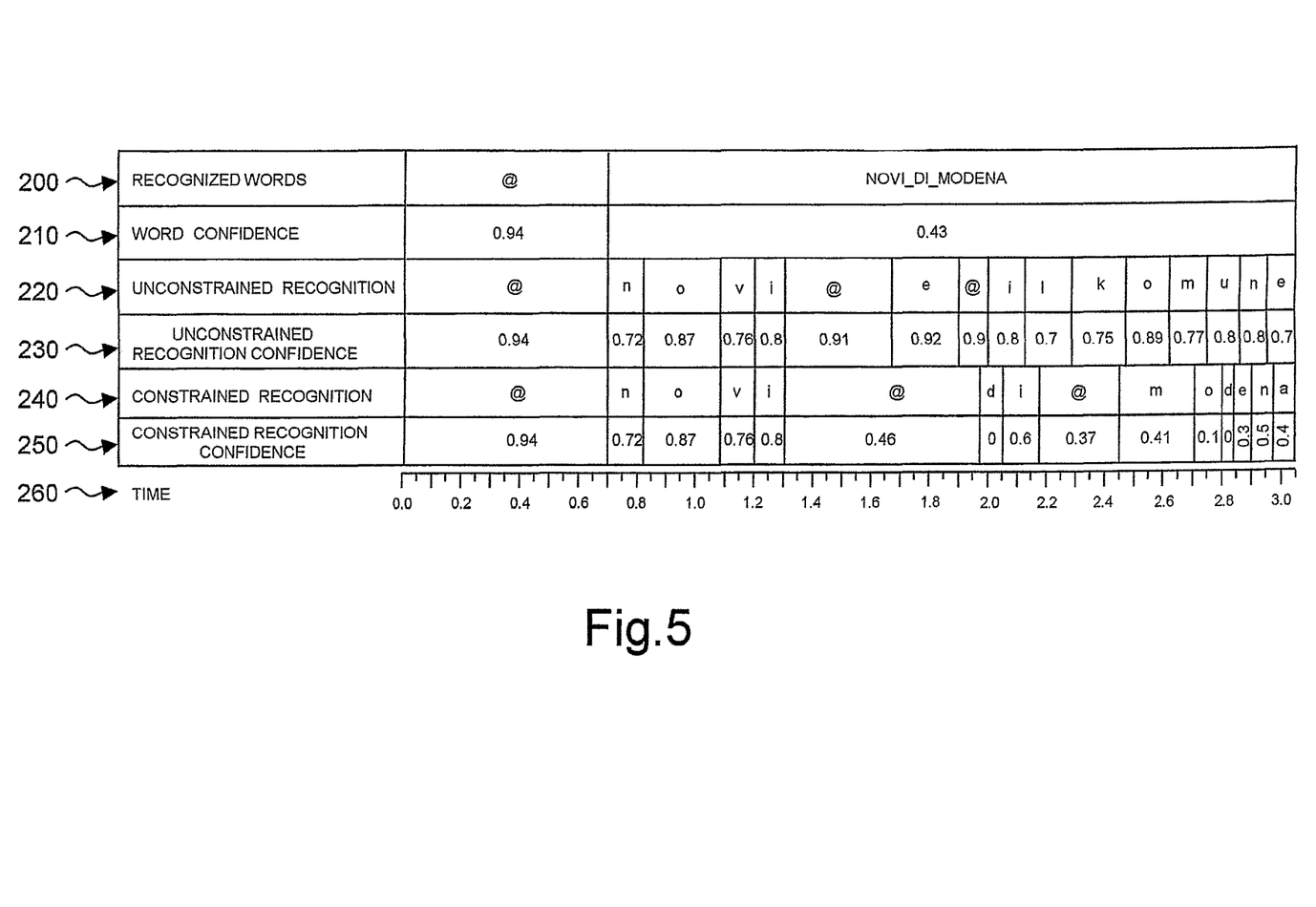
FIG. 5 shows a table containing data which shows how phonetic-level information allows temporal location of errors of non-coverage with high accuracy.

FIG. 5 shows how phonetic-level information is able to temporally locate errors of non-coverage with high accuracy, unlike that which can be achieved using only information regarding known words, wherein the same table structure as that used in the example of FIG. 3 is used.

In the example in FIG. 5, the grammar utilized has been constructed with a discrete word vocabulary of over 9000 words that includes the main Italian cities. The grammar therefore only allows the name of a city and there is no coverage for more articulate formulations. The user has pronounced the phrase "NOVI È IL COMUNE" (NOVI IS THE CITY) and the automatic speech recognition system has recognized the phrase "NOVI_DI_MODENA" (NOVI_OF_MODENA) with a confidence of 0.43. It can be easily seen that for the automatic speech recognition system, the word "NOVI" is located between 0.7 and 1.3 seconds, the word "E" between 1.7 and 1.9 seconds, the word "IL" between 2 and 2.3 seconds, and the word "COMUNE" between 2.3 and 3.1 seconds. In this case, since "NOVI" is a valid Italian city and present in the grammar, the desired behaviour would be for the automatic speech recognition system to be able to automatically detect the anomaly regarding the time segment containing the sequence of words "È IL COMUNE" (IS THE CITY), without adding the portion containing "NOVI". It may easily appreciated that what the user effectively pronounced has been detected with high precision by the unconstrained phonetic recognition (the resultant phonetic sequence is "@-n-o-v-i-@-e-@-i-l-@-c-o-m-u-n-e") and that the information contained in the sequence of recognized words, which is very simple in this case, consisting of just one word, does not allow the localized detection of the problem generated by the grammar's non-coverage of what the user pronounced. Therefore, considering that the confidence score of the recognized word "NOVI_DI_MODENA" is 0.43 and thus low, the entire phonetic string resulting from the unconstrained phonetic recognition would be selected for the successive processing steps of searching for neighbors and identifying the representatives. Behaviour of this type is extremely disadvantageous inasmuch as, in the case where the formulation "È IL COMUNE" (IS THE CITY) was quite recurrent in users' responses, this would be detected by the system, downstream of the clustering, only in the case in which there were sufficient responses of the type "X È IL COMUNE", where "X" represents one or more cities with very phonetically similar names (this due to the fact that the clusters needed to obtain hypotheses of frequent uncovered transcriptions are created by searching for similar phonetic strings), and the representative phonetic string would contain information relative to "X", losing generality. Vice versa, in the example in FIG. 5, it is possible to appreciate how the analysis of the confidences for the phoneme sequence produced by the constrained phonetic recognition provides a much more detailed picture on the location of non-coverage phenomenon. Indeed, the confidences of the phonemes relative to pronouncing the word "NOVI" are decidedly high, while the phonemes relative to the words "DI_MODENA" exhibit decidedly low confidences. In this case, through opportune analysis of the confidences of the phonemes from constrained recognition it is possible to identify the portion of the user's speech that is not covered by the grammar utilized within the time segment included between the times of 1.3 and 3.1 seconds. With regards to this temporal interval, the unconstrained phonetic transcription is effectively "@-e-@-i-l-@-c-o-m-u-n-e".

In view of the foregoing, the present invention, which has the object of automatically identifying local portions of the input speech that have a high probability of being outside the domain of the recognition grammars or the language models used for a dialogue turn, is based on the analysis of the temporal limits and the confidences of the phoneme sequence recognized via constrained phonetic recognition.

Figure 6:
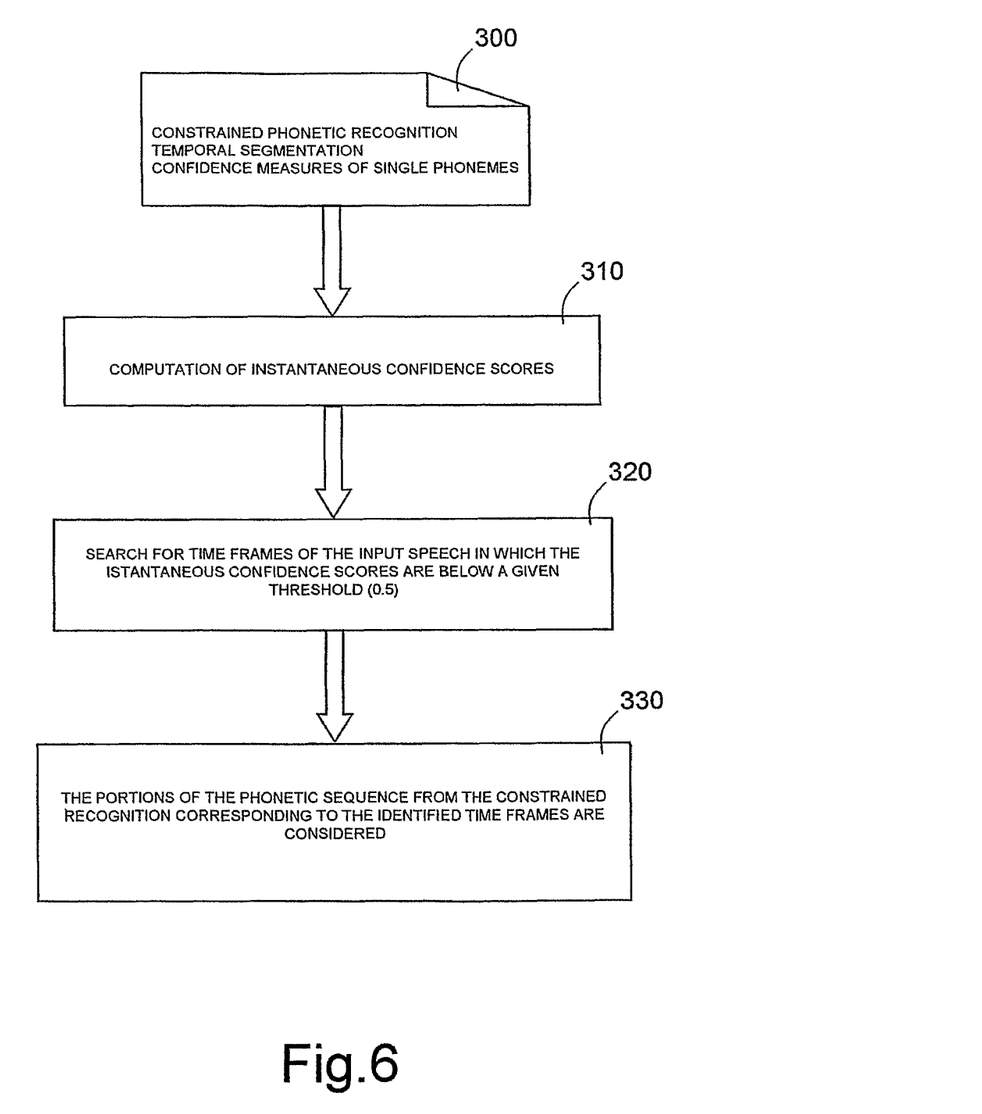
FIG. 6 shows a flowchart of the method according to the present invention.

FIG. 6 shows a flowchart of the processing steps performed in block 140 of FIG. 1 to automatically identify local portions of the input speech that have a high probability of being outside the domain of the grammars or the language models used for a dialogue turn.

As shown in FIG. 6, the input data, which is supplied by the automatic recognition system, is made up of the constrained and unconstrained phonetic recognition for a recognition turn, i.e. the sequences of the phonemes provided by the constrained and unconstrained phonetic recognition, the corresponding temporal segmentation, i.e., the time frames corresponding to each single recognized phoneme, and the confidence measure Conf(t) of each phoneme from the constrained phonetic recognition, which confidence may be computed by using any of the known methods, preferably that described in the above-referenced PCT/EP/0453718 filed in the name of the same Applicant (block 300). In particular, the confidence measure Conf(t) is a discrete-time function, and Conf($T_i$) represents the confidence value of the constrained phonetic recognition related to the content of the voice signal at discrete time quanta (frame) $T_i$. The time interval between two consecutive values $T_i$, $T_{i+1}$ should be the same as that used in the automatic speech recognition systems for calculating the acoustic parameters and typically it is 10 ms. Obviously, if a phoneme has been recognized in the constrained phonetic recognition in the temporal range $T_i$-$T_j$, Conf(t) has the same value for t=$T_i$, $T_{i+1}$, ..., $T_{j-1}$, $T_j$, and that value is the confidence of the phoneme. So the information involved in Conf(t) is related both to the sequence of the recognized phonemes and to their temporal segmentations.

With reference to FIG. 6, the first step of the method includes normalizing the confidence measures Conf(t) from the constrained phonetic recognition by computing a temporal average thereof within a moving window, preferably with a width of 500 ms and a moving step of 10 ms (block 310).

The normalization of the confidence measures Conf(t) from the constrained phonetic recognition provides a sequence of instantaneous confidence scores $C_{ist}(t)$, which are a representation of the confidence measures on a temporal base and are so termed because the information they contain, on the one hand, is correlated to time only and not to the sequence of phonemes, and on the other, because the level of detail is much more precise than that available using the confidence measures and the segmentation of the recognized word sequence.

Temporally averaging the confidence measures Conf(t) of the phonemes from constrained phonetic recognition is particularly advantageous because the moving window introduces an appreciable smoothing effect on the values of the confidence measures: it is in fact possible that inside speech segments not covered by domain-related knowledge, there are segments of very short duration with good phonetic consistency, and, as the purpose of an automatic speech recognition system is to identify the most probable sequence of words, the use of a relatively wide moving window, allows all contextual information to be accurately considered.

In particular, the instantaneous confidence score $C_{ist}(t)$ at time t may be computed as follows:

$$C_{ist}(t) = \frac{1}{2T+1} \sum_{t=-n-T}^{n+T} Conf(t)$$

wherein 2T+1 is the width of a moving window centered at time t. The computation of the instantaneous confidence score $C_{ist}(t)$ at times t close to the start and the end of the speech, only the available confidence measures are used (at start and end of the speech a "left" and respectively a "right" contexts do not exist).

Once the instantaneous confidence scores $C_{ist}(t)$ have been computed, they are analyzed in detail with the aim of identifying temporally contiguous segments in which the instantaneous confidence scores $C_{ist}(t)$ are lower than a reliability threshold (block 320). For the automatic speech recognition system with phonetic learning produced by the Applicant, the reliability threshold has been estimated at 0.5 for phone inputs. In addition, the temporal segments must have a significant minimum duration in order to be able to represent non-spurious voice phenomena.

For each temporal segment identified through the analysis of instantaneous confidence scores $C_{ist}(t)$, the corresponding phoneme sequence from the unconstrained phonetic recognition (i.e., the phoneme sequence that the unconstrained phonetic recognition provides within this temporal segment) is considered (block 330). If the sequence starts and/or finishes with a silence phoneme, it is deleted, and the resulting sequence is saved in a database of formulations to be subsequently processed if the number of phonemes in the sequence is within a certain range, defined by the designer, for example from three to fifteen phonemes. This is to avoid adding sequences that are too short to permit the generation of significant representative strings, or sequences that are too long, which are difficult to cluster and more unstable. For the latter, if necessary it is possible to consider shorter phonetic strings obtained by considering portions of the initial phonetic string, separated by silences. In addition to the strings, the references to the recognition turn and, if available, its relative audio file, with the temporal limits, could also be saved in the database. In this way, in cases where the saved string contributes to generating a hypothesis regarding a problem of missing coverage, it will be possible to listen to the user's formulations, thereby speeding up the validation process.

The phonetic strings so obtained on a possibly large number of interactions are then processed as previously described with reference to FIG. 1, i.e., they are clustered into similar sets of transcriptions to produce a list of possible hypotheses of frequent, not covered formulations. The clusters are created by means of a hierarchical algorithm to search for similar phonetic strings, based on computation of the mutual distance between phonetic strings. To make the processing times acceptable, a recursive procedure operating on tree structures may be used, where the tree branches are phonetic transcriptions. For clusters characterized by a large number of phonetic strings with low dispersion, the central element is identified as that having the smallest sum of the distances between itself and the phonetic strings forming the cluster. For a more detailed description of the algorithms utilized for clustering and identifying the representative phonetic strings, reference may be made to the above-referenced publications *Towards Automatic Adaptation of the Acoustic Models and of Formulation Variants in a Directory Assistance Application*, and *Learning New User Formulation in Automatic Directory Assistance*.

The hypotheses provided by the system and their addition to the grammars and to the language models must be assessed by the voice application designers because it is possibly necessary to assign semantic actions to the recognized formulations or, rather than updating the recognition objects, it might be advisable to change the questions put to the user in order to guide the dialogue process better. In addition, the system could use the same algorithm for identifying similar phonetic strings, utilizing it on a sufficiently broad vocabulary, to provide designers with a set of "graphemic" formulations obtained from the phonetic ones recognized by the system.

Finally, it should be observed that obtaining information regarding unconstrained and constrained phonetic recognitions requires performing two additional recognitions. Therefore, in order to decrease response times and system memory requirements, it is possible to perform these additional recognitions later on and on machines other than those utilized for the service. The solution adopted by the Applicant consists in executing these additional recognitions at the end of the grammar recognition utilized by the voice application, while saving all the likelihoods of emission computed during normal recognition. This results in a small increase in the memory requirements and machine time needed to provide the necessary information for phonetic learning.

The advantages of the present invention are evident from the foregoing description.

In particular, the present invention allows portions of the input speech not covered by the grammar or the language model employed to be easily identified, on the basis of recognition data, with a good safety margin, thus providing a good support for resolving problems related to insufficient coverage of formulations frequently utilized by the users of an automatic phonetic-learning-enabled voice service. The system suggests to the application designers formulation hypotheses, or individual words not contemplated by the grammar and language model, and the developers will be able to validate the system hypotheses and, if necessary, update the grammars or language models used by the service, with minimal effort with respect to the manual analysis of field data. The data used by the system is that obtained by an automatic continuous speech recognition system and does not require validation or checking by the operators for producing hypotheses of missing coverage.

Finally, it is clear that numerous modifications and variants can be made to the present invention, all falling within the scope of the invention, as defined in the appended claims.

In particular, identification of the formulations in the input speech that are not covered by the grammar or language models employed may be based on constrained phonetic elements from the constrained phonetic recognition different than phonemes, for example syllables or other phonetic units.

Moreover, identification of the formulations in the input speech that are not covered by the grammar or language models employed based directly on the confidence measures Conf(t) of the constrained phonemes from the constrained phonetic recognition, rather than on the instantaneous confidence scores $C_{ist}(t)$.

The invention claimed is:

1. A method for automatically providing a hypothesis of a linguistic formulation that is uttered by a user, the method comprising:
   automatically providing a hypothesis of a linguistic formulation that is uttered by a user of an automatic voice service based on an automatic speech recognition system that is outside a recognition domain of said automatic speech recognition system by:
   providing a constrained speech recognition and an unconstrained speech recognition of a portion of a first input speech signal that is outside a recognition domain of said automatic speech recognition system, the constrained speech recognition includes constrained phonemes based on a sequence of time segments and the unconstrained speech recognition includes unconstrained phonemes based on the sequence of time segments;
   identifying and temporally segmenting a given constrained phoneme of said constrained speech recognition corresponding to a time segment of the given constrained phoneme in order to determine whether the given constrained phoneme is outside said recognition domain, including:
      computing confidence measures for the constrained phonemes of said constrained speech recognition, wherein the confidence measures include a discrete time quanta, and
      identifying said given constrained phoneme of said constrained speech recognition outside said recognition domain based on said confidence measures;
   identifying and temporally segmenting a given unconstrained phoneme of said unconstrained speech recognition corresponding to a time segment of the given unconstrained phoneme, the time segment of the given unconstrained phoneme being substantially the same as the time segment of the given constrained phoneme; and
   providing said linguistic formulation hypothesis based on said identified unconstrained phoneme of said unconstrained speech recognition.

2. The method as claimed in claim 1, wherein said confidence measures are computed for phonemes of said constrained speech recognition.

3. The method as claimed in claim 1, wherein identifying said constrained phoneme of said constrained speech recognition outside said recognition domain based on said confidence measures comprises:
   identifying phonemes of said constrained speech recognition with confidence measures that meet a given criterion.

4. The method as claimed in claim 3, wherein identifying phonemes of said constrained speech recognition with confidence measures that meet a given criterion further include normalizing the constrained speech confidence measures by:
   computing instantaneous confidence scores as a temporal average of said confidence measures within a moving window; and
   identifying phonemes of said constrained speech recognition with instantaneous confidence scores that meet a first relation.

5. The method as claimed in claim 4, wherein each instantaneous confidence score ($C_{ist}(t)$) is computed according to the following formula:

$$Cist(t) = \frac{1}{2T+1} \sum_{t=-n-T}^{n+T} \text{Conf}(t)$$

wherein (Conf(t)) is said confidence measure, and 2T+1 is width of said moving window centered at time t.

6. The method as claimed in claim 5, wherein said first relation is defined by said instantaneous confidence scores being lower than a given threshold.

7. The method as claimed in claim 1, wherein identifying the unconstrained phoneme of said unconstrained speech recognition comprises:
   identifying a phoneme of said input speech signal corresponding to said identified constrained phoneme of said constrained speech recognition; and
   identifying the unconstrained phoneme of said unconstrained speech recognition corresponding to said identified phoneme of said input speech signal.

8. The method as claimed in claim 1, further comprising:
   deleting any silences at the start or at the end of the said identified unconstrained phoneme of said unconstrained speech recognition.

9. The method as claimed in claim 1, further comprising:
   saving said identified unconstrained phoneme of said unconstrained speech recognition in a database of recognitions outside said recognition domain.

10. The method as claimed in claim 9, wherein said identified unconstrained phoneme of said unconstrained speech recognition is saved in said database of recognitions outside said recognition domain if its length meets a second relation.

11. The method as claimed in claim 10, wherein said second relation is defined by the length of said identified unconstrained phoneme of said unconstrained speech recognition being within a defined range.

12. The method as claimed in claim 9, further comprising:
   processing said database of recognitions outside said recognition domain to provide said hypothesis of linguist formulation that is outside said recognition domain.

13. The method as claimed in claim 1, wherein said recognition domain comprises a recognition grammar and/or a language model.

14. The method as claimed in claim 1, further including:
   processing one or more portions of other input speech signals outside said recognition domain to determine whether the linguistic formation hypothesis of the first input signal applies; and
   clustering utterances uttered by one or more users of an automatic voice service based on an automatic speech recognition system that are outside a recognition domain of said automatic speech recognition system.

15. A system for automatically providing hypothesis of linguistic formulations that are uttered by users of an automatic voice service based on an automatic speech recognition system and that are outside a recognition domain of the automatic speech recognition system, said system comprising a computer configured to:
   automatically provide a hypothesis of a linguistic formulation that is uttered by a user of an automatic voice service based on an automatic speech recognition system that is outside a recognition domain of said automatic speech recognition system by:
   providing a constrained speech recognition and an unconstrained speech recognition of a portion of a first input speech signal that is outside a recognition domain of said automatic speech recognition system, the constrained speech recognition includes constrained phonemes based on a sequence of time segments and the unconstrained speech recognition includes unconstrained phonemes based on the sequence of time segments;

identifying and temporally segmenting a given constrained phoneme of said constrained speech recognition corresponding to a time segment of the given constrained phoneme in order to determine whether the identified constrained phoneme is outside said recognition domain, including:

computing confidence measures for constrained phonemes of said constrained speech recognition, wherein the confidence measures include a discrete time quanta, and     identifying said constrained phoneme of said constrained speech recognition outside said recognition domain based on said confidence measures;

identifying and temporally segmenting a given unconstrained phoneme of said unconstrained speech recognition corresponding to a time segment of the given unconstrained phoneme, the time segment of the given unconstrained phoneme being substantially the same as the time segment of the given constrained phoneme; and providing said linguistic formulation hypothesis based on said identified unconstrained phoneme of said unconstrained speech recognition.

16. A non-transitory computer program medium encoded with a computer program comprising a computer program code, wherein the computer program code, when loaded in a computer, causes the computer to:

automatically provide a hypothesis of a linguistic formulation that is uttered by a user of an automatic voice service based on an automatic speech recognition system that is outside a recognition domain of said automatic speech recognition system by:

providing a constrained speech recognition and an unconstrained speech recognition of a portion of a first input speech signal that is outside a recognition domain of said automatic speech recognition system, the constrained speech recognition includes constrained phonemes based on a sequence of time segments and the unconstrained speech recognition includes unconstrained phonemes based on the sequence of time segments;

identifying and temporally segmenting a given constrained phoneme of said constrained speech recognition corresponding to a constrained phoneme time segment in order to determine whether the identified constrained phoneme is outside said recognition domain, including:

computing confidence measures for the constrained phonemes of said constrained speech recognition, wherein the confidence measures include a discrete time quanta, and     identifying said constrained phoneme of said constrained speech recognition outside said recognition domain based on said confidence measures;

identifying and temporally segmenting a given unconstrained phoneme of said unconstrained speech recognition corresponding to time segment of the given unconstrained phoneme, the time segment of the given unconstrained phoneme being substantially the same as the time segment of the given constrained phoneme; and providing said linguistic formulation hypothesis based on said identified unconstrained phoneme of said unconstrained speech recognition.

17. A method for providing an automatic voice service based on an automatic speech recognition system, comprising:

receiving an input speech signal;

performing an automatic speech recognition based on said input speech signal; and providing a hypothesis of a linguistic formulation that is uttered by a user of said automatic voice service and that is outside a recognition domain of said automatic speech recognition system, wherein said hypothesis is automatically provided by:

automatically providing a hypothesis of a linguistic formulation that is uttered by a user of an automatic voice service based on an automatic speech recognition system that is outside a recognition domain of said automatic speech recognition system by:

providing a constrained speech recognition and an unconstrained speech recognition of a portion of a first input speech signal that is outside a recognition domain of said automatic speech recognition system, the constrained speech recognition includes constrained phonemes based on a sequence of time segments and the unconstrained speech recognition includes unconstrained phonemes based on the sequence of time segments;

identifying and temporally segmenting a given constrained phoneme of said constrained speech recognition corresponding to a time segment of the given constrained phoneme in order to determine whether the identified constrained phoneme is outside said recognition domain, including:

computing confidence measures for the constrained phonemes of said constrained speech recognition, wherein the confidence measures include a discrete time quanta, and     identifying said constrained phoneme of said constrained speech recognition outside said recognition domain based on said confidence measures;

identifying and temporally segmenting a given unconstrained phoneme of said unconstrained speech recognition corresponding to a time segment of the given unconstrained phoneme, the time segment of the given unconstrained phoneme being substantially the same as the time segment of the given constrained phoneme; and providing said linguistic formulation hypothesis based on said identified unconstrained phoneme of said unconstrained speech recognition.

\* \* \* \* \*